(12) United States Patent
Walia et al.

(10) Patent No.: US 7,748,042 B2
(45) Date of Patent: Jun. 29, 2010

(54) SECURITY VULNERABILITY DETERMINATION IN A COMPUTER SYSTEM

(75) Inventors: Suraj Walia, Noida (IN); Juby Jacob, Alhparetta, GA (US); Makarand Vidwans, Hyderabad (IN)

(73) Assignee: Genpact Limited, Hamilton (BM)

( * ) Notice: Subject to any disclaimer, the term of this patent is extended or adjusted under 35 U.S.C. 154(b) by 0 days.

(21) Appl. No.: 11/522,007

(22) Filed: Sep. 14, 2006

(65) Prior Publication Data

US 2008/0072328 A1    Mar. 20, 2008

(51) Int. Cl.
G06F 11/00 (2006.01)
G06F 12/14 (2006.01)
G06F 11/30 (2006.01)

(52) U.S. Cl. .......................... 726/25; 726/22; 713/189; 713/194

(58) Field of Classification Search .................... 726/25
See application file for complete search history.

(56) References Cited

U.S. PATENT DOCUMENTS 5,892,903 A * 4/1999 Klaus .......................... 726/25

FOREIGN PATENT DOCUMENTS

WO    WO 03060717 A1 *    7/2003

OTHER PUBLICATIONS

Ramana Rao Kompella, Sumeet Singh, George Varghese, "On scalable attack detection in the network", Oct. 2004, IMC '04: Proceedings of the 4th ACM SIGCOMM conference on Internet measurement, Publisher: ACM, pp. 187-200.*

* cited by examiner

Primary Examiner—Matthew B Smithers
Assistant Examiner—Courtney D Fields
(74) Attorney, Agent, or Firm—Kenyon & Kenyon, LLP

(57) ABSTRACT

Security level of a computing system may be computed based on determining various security factor values for different operational aspects of the processing components. These security factor values are scaled to representative values or other types of identifiers. These security factor values may then be mapped on a security expectation scale, including taking into account the corresponding operational aspects. From this security factor value mapping, a computing system security determination can be calculated, which provides a vulnerability determination for the computing system providing information not only to the individual components, but also to the system as a whole.

21 Claims, 4 Drawing Sheets

| CATEGORY | RATING |
|---|---|
| AVAILABILITY | 1 |
| AUTHORIZATION | 3 |
| ACCESS CONTROL | 1 |
| AUDITABILITY | 2 |
| INTEGRITY | 4 |
| CONFIDENTIALITY | 2 |

| CATEGORY | CRM SYSTEM | ERP SYSTEM | SCM SYSTEM | PERIMETER SECURITY |
|---|---|---|---|---|
| AVAILABILITY | 2 | 4 | 3 | 2 |
| AUTHORIZATION | 3 | 2 | 1 | 0 |
| ACCESS CONTROL | 4 | 2 | 1 | 0 |
| AUDITABILITY | 1 | 4 | 1 | 0 |
| INTEGRITY | 4 | 3 | 1 | 1 |
| CONFIDENTIALITY | 3 | 2 | 1 | 1 | ns in the different components can have unintended
SECURITY VULNERABILITY DETERMINATION IN A COMPUTER SYSTEM

COPYRIGHT

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND

The present invention relates generally to security procedures for a computer processing environment, and more specifically to analyzing and determining a present security vulnerability level for the computer processing environment based on a collection of security values for different operational aspects.

As existing processing systems increase in complexity, security is always a paramount concern. From even the early development of computing environments, security features have been included. Earlier security features includes simple procedures such as login identifiers and passwords and have since evolved to varying levels, including techniques such as public and private key encryption.

Existing security systems typically focus on a particular component of the processing environment. This can be problematic due to the varying amounts of components or operating aspects. For example, in an enterprise management software application, there are numerous layers of processing operations, data storage and user interaction. A security technique for one layer may not have any affect or benefits to the other layers.

By way of example, an enterprise resource planning (ERP) application may include a large database of information usable by processing routine on an application layer. Various security protocols and operations may be included in the interface layer to prevent unauthorized access to the data through the applications, for example verifying user authenticity when the user logs into the system. The ERP system may also include data integrity or batch processing operations to monitor the data itself to insure there are no unauthorized access of data through other means outside of the interface layer. The ERP system may also include accessibility protocols defining various levels of user authorization to data and preventing any unauthorized data access, such as someone with a low security clearance accessing highly confidential or otherwise sensitive information.

The present approach to system security is a piecemeal technique that examines each of the various aspects of the system. This piecemeal technique fails to provide a global security synopsis of the full operating system. Under existing techniques, the security of the data in the database can determined, the ability to breach the security of the user interface can be determined and other security aspects are individually determined. These disparate determinations do not provide a collective indication of existing system security. Therefore, under existing techniques, an end user must actively monitor each of these various components in the hopes that no single component becomes the weakest link in the security chain. Additionally, the end user is unable to have a reliable metric for determining complete system security, but rather can only obtain knowledge as to the security of each individual component.

In addition, the present disparate security vulnerability determination technique complicates system development. As there is no present technique for analyzing a system-wide security level, designers and system developers cannot improve system designs in a holistic fashion, but rather address the components individually. As these varying layers in the processing environment are intricately interrelated, changes in the different components can have unintended security consequences for the other components, further complicating the design process.

Currently, there are several known security development techniques. One existing technique is commonly known as the System Security Engineering Capability Maturity Model technique, also referred to by the acronym SSE-CMM. This engineering technique is a tool for evaluating security engineering practices and defining improvements to the evaluated practices. Another development technique is DMAIC, which is part of the Six Sigma development technique. DMAIN is a data-driven quality strategy for improving varying processing operations and refers to Define, Measure, Analyze, Improve and Control.

Similar to the current limitations found in existing computing systems, these security and system development tools are not presently applicable to full computing systems. Existing systems, including development and refinement procedures can focus on the individual processing components but fail to address the processing system as a whole. Therefore, there exists a need, among other solutions, for operations and techniques to evaluate security levels of a processing environment and allow for design adjustments and improvements therein.

DETAILED DESCRIPTION

Generally, security level of a computing system may be computed based on determining various security factor values for different operational aspects of the processing components. These security factor values are scaled to representative values or other types of identifiers. These security factor values may then be mapped on a security expectation scale, including taking into account the corresponding operational aspects. From this security factor value mapping, a computing system security determination can be calculated, which provides a vulnerability determination for the computing system providing information not only to the individual components, but also to the system as a whole.

Figures 1, 2:
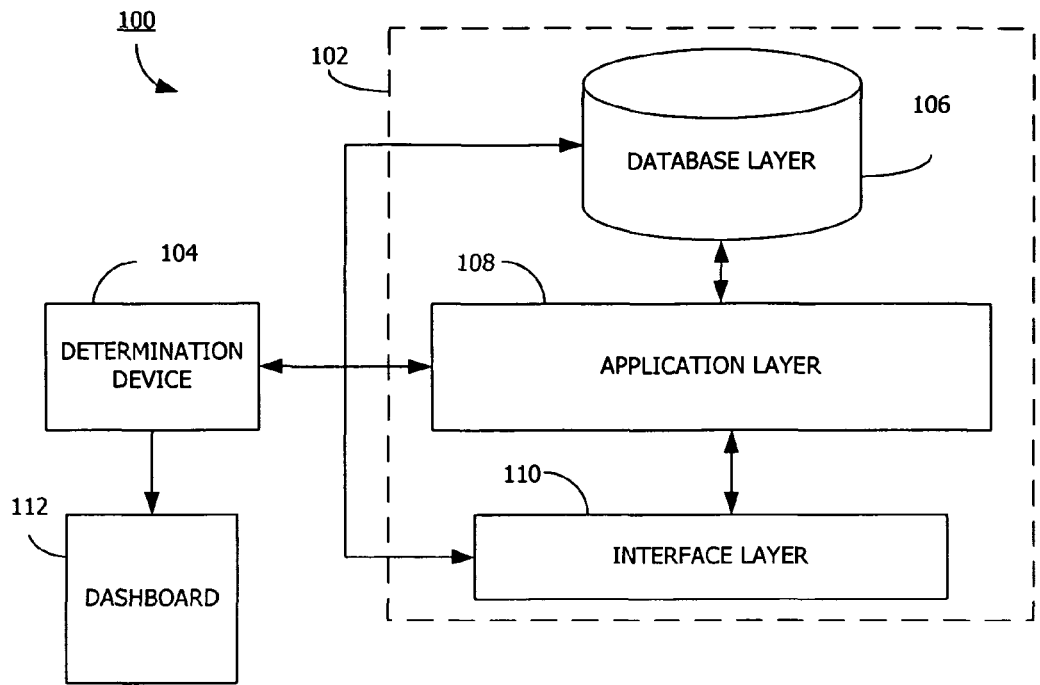
FIG. 1 illustrates a block diagram of one embodiment of an apparatus for determining a security level of a computing system.
FIG. 2 illustrates an exemplary embodiment of a table including a plurality of operational aspects and security factor values for each of the operational aspects.

More specifically, FIG. 1 illustrates a system 100 including a computing system 102 and a determination device 104. The computing system 102 includes a database layer 106, an application layer 108 and an interface layer 110. Additional components have been omitted for clarity purposes only. Additionally, the system 100 also includes an output device 112 coupled to the determination device 104 providing a dashboard display, as described in further detail below.

The computing system 102 may be an enterprise software application, such as, by way of example, an enterprise resource planning (ERP) application. In this embodiment, the system 102 includes the three interconnected layers allowing for user access and functionalities with the system. The database layer 106 represents the data storage locations, which may be in one or more locations centrally stored or distributed across one or more networks. The application layer 108 may be one or more processing devices performing executable instructions, such as found within the software application. This layer 108 may include the associated functionality of the system, such as data manipulation operations or data management operations as commonly found in enterprise applications or other known applications.

Still within the system 102, the interface layer 110 provides user access to the application layer 108 and subsequent access to the database layer 106. As recognized with computing systems, such as the system 102, the interface layer 110 may provide for various levels of user access and interface, such as local and networked access and may include attendant security functions associated with such operations.

The determination device 104 may be one or more processing devices operative to perform various processing operations as described in further detail below. While illustrated in FIG. 1 as separate from the computing system 102, the determination device 104 may be integrated into the system 102 or may be disposed in a remote position to accurately monitor the system 102 to acquire the requisite security information, such as across a secure networked connection, for example.

In one embodiment, the determination device 104 examines the computing system 102 to determine security factor values for different operational aspects. These values are associated with processing components of the system 102, more specifically with processing components of the elements within the system 102, such as the database 106, the application layer 108 and the interface layer 110. Additionally, the determination device 104 may examine the interaction between the different components, such as for example techniques or operations for accessing the database layer 106 through the interface layer 110 or through the application layer 108.

In one embodiment, the operational aspects include the categories of availability, authorization, access control, auditability, integrity and confidentiality. It is recognized that further operational aspects may be examined. The operational aspects may relate to system vulnerability aspects. It is recognized by one having ordinary skill in the art that different operational aspects may be selected based on any number of factors, such as the processing environment, the processing operations, the system administrator or users preferences, for example.

FIG. 2 illustrates a graphical representation of a table 120 that may be assembled by the determination device 104 of FIG. 1. In this exemplary embodiment, the six operational aspects are selected and measured. The availability operational aspect indicates whether a processing resource will be usable during a given time period, for example, whether an encrypted file can be decrypted when necessary. The authorization operational aspect indicates a determination whether a contacting entity, such as a user or system, is trusted to act for a given purpose, for example, allowed to read a particular file. The access control operational aspect includes a determination of the granting or denying to a subject of certain permissions to access a resource, for example to view a certain file, to run a certain program. The auditability operational aspect includes a determination of a status achieved by employing a digital signature procedure to affirm the identity of the signer of a digital message with extremely high confidence and, hence, to protect against a subsequent attempt to deny authenticity, whether or not there had been an initial authentication. The integrity operational aspect includes the property that an object meets an a priori established set of expectations. One example of integrity is that changes must be accomplished in a specified and authorized manner. Data integrity, program integrity, system integrity, and network integrity are all relevant to consideration of computer and system security. Confidentiality operational aspect may include a determination of communications traffic against interception or receipt by unauthorized third parties and an assertion about a body of data that is sensitive and must be protected against loss, misuse, destruction, unintended change, and unauthorized access or dissemination.

In one embodiment, the determination device examines the operations of the computing system 102 in an "as is" state, which is the present or existing operation state of the computing system 102. This operational snapshot provides an accurate system-level performance snapshot. The determination device may include defined rubrics for each of the operational aspects as it relates to the specific security factor values. For example, one embodiment may include a database (not shown) of conditions that are examined and based on these conditions a security factor value can be assigned. By way of example, under the operational aspect of integrity, the determination device may examine which procedures are taken to insure the integrity of the data, such as redundancy operations and other techniques.

In the table 120 of FIG. 2, a second column includes a rating factor that corresponds to the security factor value. In one embodiment, the security factor values may have any suitable range, such as from a low point of inefficient to a high point of supreme efficiency. As desired by the system and the processing ability to categorize varying degrees of information, FIG. 2 illustrates an exemplary embodiment having a ranking system of five numbers, from zero (0) to four (4). In this example, zero may indicate the lowest level of efficiency for an operational aspect and four may indicate the highest level of efficiency, such as the efficiency of performing the corresponding operational aspect, with values of one, two and three intermediately ranging therebetween. In one embodiment, these efficiency factors may be entering various audit scores or other data information includes a spreadsheet or other type of information analysis vehicle.

For illustration purposes, the table 120 of FIG. 2 includes sample ratings for the various operation aspect categories. With reference back to FIG. 1, the determination device 104, upon examination of the computing system 102 and the components therein, assembles the information to generate the operational aspect data with security factor values. In one embodiment, the security factor values are determined by performing an audit on the computing system based on the guidelines used to determine the efficiency factors. Additionally, the determination device 104 is operative to map each of the security factor values on a security expectation scale.

Figure 3:
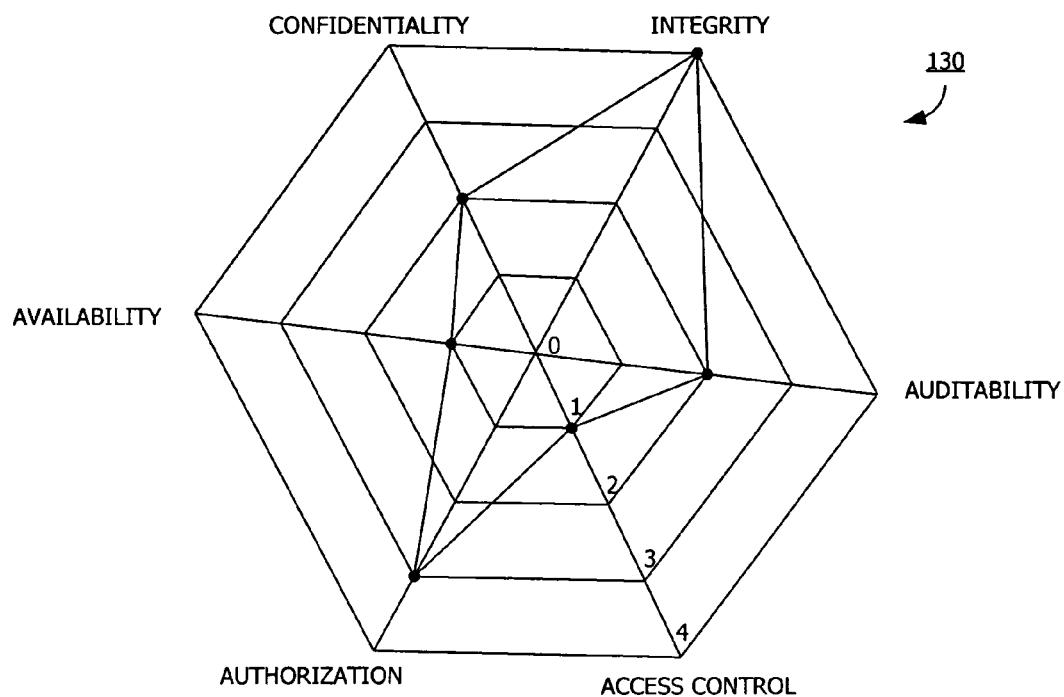
FIG. 3 illustrates a graphical representation of security expectation scale having the exemplary security factor values of the table of FIG. 2.

FIG. 3 illustrates a security expectation scale 130, which is a six-sided scale to encompass the representative six operational aspects of the chart 120 of FIG. 2. The determination device 104 may determine N number of operational aspects, where N may be any suitable integer value and thereby the security expectation scale may be an N-sided object having concentric rings associated with the varying security factor values. As illustrated in FIG. 3, the center point indicates a security factor 0, which corresponds to an inefficient operation in the computing system 102, the first ring from center indicates a security feature value of 1, second ring indicates a security feature value of 2, third ring indicates a security feature value of 3 and the outer ring, in this embodiment indicates the highest security feature value, 4.

In the mapping of the security factor values, an area is defined by the security factor values for each of the operational aspects. As visible in the chart 130 of FIG. 3, the availability aspect has a value of 1, authorization has a value of 3, access control has a value of 1, auditability has a value of 2, integrity has a value of 4 and confidentiality has a value of 2, mirroring the table 120 of FIG. 2. From this mapping information, the determination device 104 may thereupon generate a computing system security determination. This determination may be a value based on the association of the security factor values for the different operational aspects of the processing components. This factor thereupon determines the system's vulnerability to security issues.

Referring back to FIG. 1, with the security/vulnerability information, the determination device 104 may provide this information to the dashboard 112. This dashboard 112 may be a simple user interface displaying the various information. For example, in one embodiment the dashboard may provide a visual display of the map itself, in another embodiment the display may provide an output of the vulnerability information. In another embodiment, as described in further detail below, the dashboard may provide feedback or design information including analysis of problematic operational aspects for design or redesign purposes.

Figure 4:
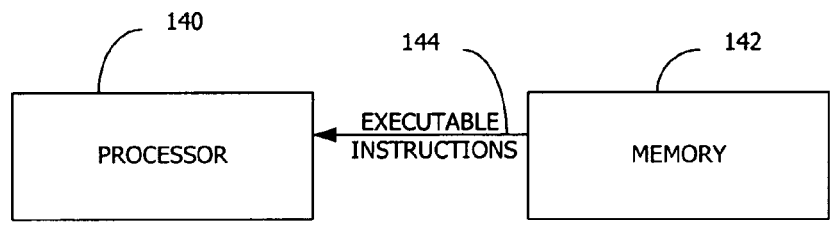
FIG. 4 illustrates a block diagram of a processing device operative to execute the processing operations of the present invention.

FIG. 4 illustrates a block diagram of one embodiment an apparatus for determining a security level of a computing system. The apparatus includes a processor 140 and a memory 142. The memory 142 includes executable instructions 144 stored therein such that the processing device, upon receipt of the executable instructions, is operative to perform various processing operations. The processor 140 may be one or more processing devices centrally or remotely disposed in a processing environment, such as found with the determination device 104 of FIG. 1 or may be incorporated with the computing system 102. The memory 142 may be any suitable type of memory operative to store and provide the executable instructions 144 to the processor, where the memory 142 may be remote to the processor 140 or in another embodiment may be internally disposed within the processor 140 or within a computing environment having the processor 140 incorporated therein.

Figure 5:
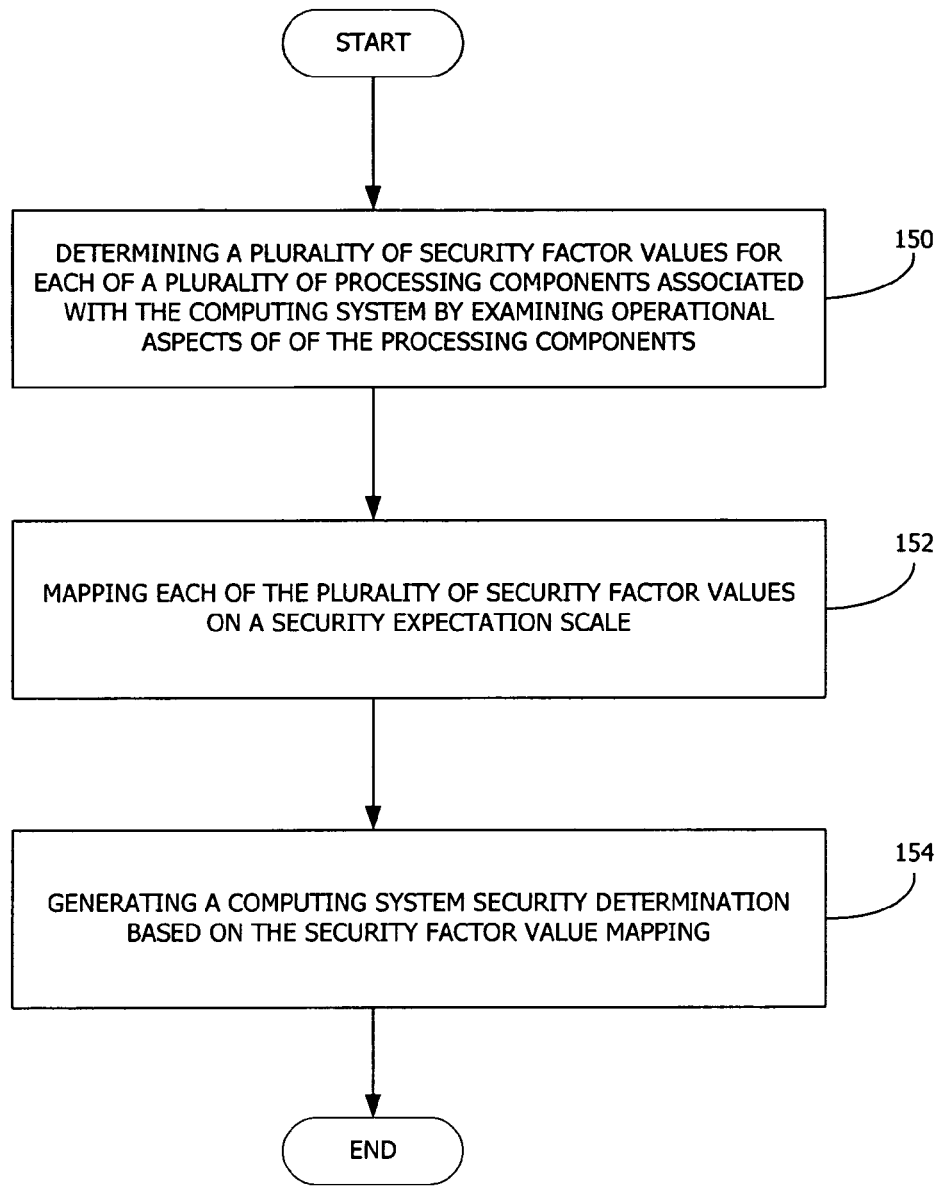
FIG. 5 illustrates the steps of a flowchart of one embodiment of a method for determining a security level of a computing system.

FIG. 5 illustrates the steps of a flowchart of a method for determining a security level of a computing system. These steps may also be performed, in one embodiment, by the processing device 140 of FIG. 4 in response to executable instructions 144. In the method of FIG. 5, the first step, step 150, is determining various security factor values for different processing components associated with a computing system by examining operations aspects of the components. As described above, this step may include an analysis of the computing system operating the software application, such as a computing system operating an ERP application. The security factor values can be determined based on an analysis of the performance of the operational aspects and then quantifying this analysis for each operational aspect.

The next step, step 152, is mapping each of the plurality security factor values on a security expectation scale. FIG. 3 illustrates the mapping of the sample chart 120 of FIG. 2 based on defining the operational aspects as different axes and then mapping the security factor values on each of the appropriates aces.

In this embodiment, the next step, step 154, is generating a computing system security determination based on the security factor value mapping operation. Varying techniques may be used to quantify this security determination as it may reflect as computing system vulnerability. Congruent with a systems security level is the system's vulnerability by indicating different operational aspects that can be subject to compromise. As discussed in further detail below, this system security information can be used to determine techniques to improve system security or assist in the system development or redesign. Although, as to the method of FIG. 5, in this embodiment, the method is complete.

In addition to determining the vulnerability of an existing system, the security level determination may be used to design or improve an existing system. As described above, there are various known security development techniques, such as the SSE-CMM and DMAIC techniques. These techniques were previously only applicable to individual components based on the inability to determine vulnerability for a computing system from an end-to-end perspective. The vulnerability determination techniques described above provide feedback for system development consistent with the SSE-CMM and DMAIC techniques.

Figures 6, 7:
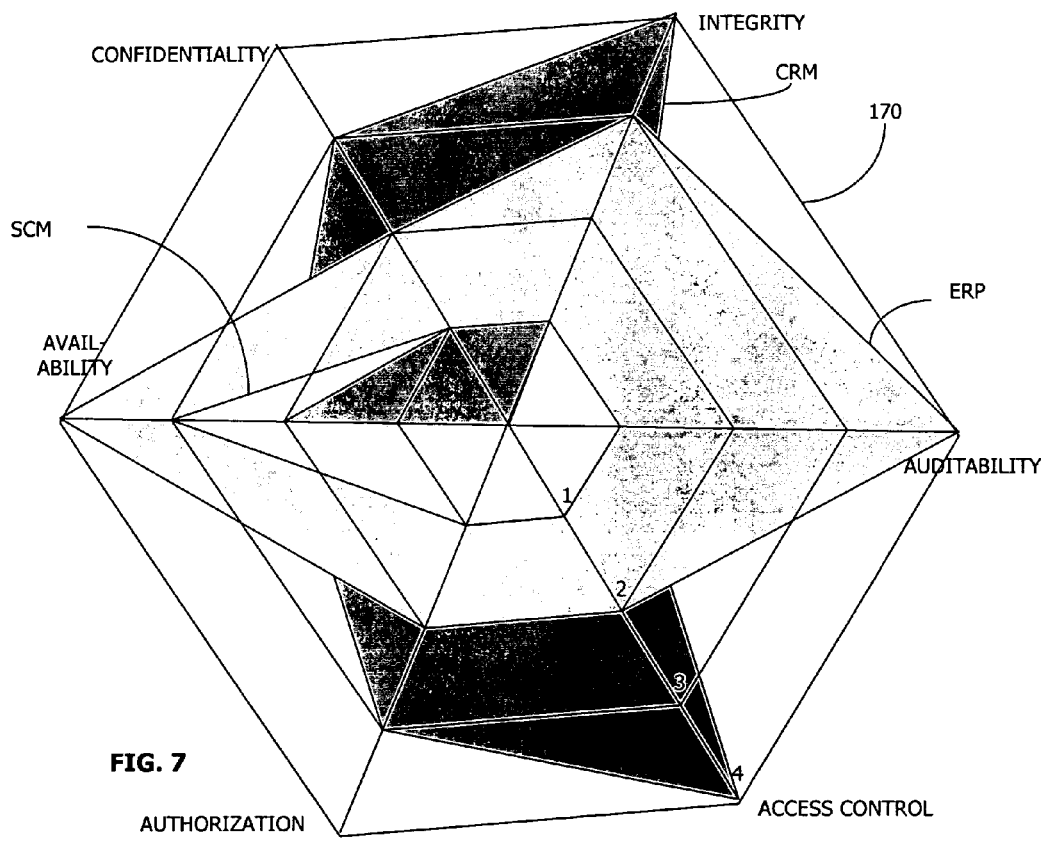
FIG. 6 illustrates another exemplary embodiment of a table including operational aspects and security factor values for various processing components in a multi-system processing environment.
FIG. 7 illustrates a graphical representation of a security expectation scale including the security factor values of the table of FIG. 4 mapped thereon.

In conjunction with development operations, base line determinations should be defined. While the above description describes an ERP system, it is recognized that the vulnerability determination may also be applicable to a customer resource management (CRM) system, supply chain management (SCM) and perimeter security features. FIG. 6 illustrates a table 160 of one example of baseline security factor values for the different operational aspects for the different operating systems. By way of example, the chart 160 illustrates that a baseline customer satisfaction efficiency level for the integrity of the data in an SCM system is a very low. Whereas, by way of further example, access control in the CRM system should be very efficient.

FIG. 7 illustrates a map 170 of the corresponding chart 160 on the security expectation scale. This map 170 may provide a benchmarking outline for the development or improvement of a processing system. For example, an as is snapshot of a system may be graphically compared to the baseline chart and provide an indication of the aspects that need improvement. This benchmarking information can be then readily incorporated in the known SSE-CMM and DMAIC techniques, where the benchmarking operation now provides a greater level of information and an end-to-end perspective of information not previously available in the enterprise application system design/redesign environment.

In one embodiment, this benchmarking information may be provided through the dashboard 112 of FIG. 1. As describe above, the dashboard may provide a snapshot of the vulnerability of the current system or can provide feedback functions for system design, redesign, improvements or other operations consistent with SSE-CMM and DMAIC techniques. It is also recognized that this information may be readily usable with other development techniques as recognized by one having ordinary skill in the art.

Although the preceding text sets forth a detailed description of various embodiments, it should be understood that the legal scope of the invention is defined by the words of the claims set forth below. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should be understood that there exist implementations of other variations and modifications of the invention and its various aspects, as may be readily apparent to those of ordinary skill in the art, and that the invention is not limited by specific embodiments described herein. It is therefore contemplated to cover any and all modifications, variations or equivalents that fall within the scope of the basic underlying principals disclosed and claimed herein.

What is claimed is:

1. A method for determining a security level of a computing system, the method comprising:
   determining a plurality of security factor values for each of a plurality of processing components associated with the computing system by examining operational aspects of the processing components;
   mapping each of the plurality of security factor values on a security expectation scale; and
   generating a system vulnerability report based on the security factor value mapping from the security expectation scale.

2. The method of claim 1 wherein the computing system operates in at least one of: an enterprise resource planning operating system and a customer relationship management system.

3. The method of claim 2 wherein the processing components include at least one of: a network layer, an interface layer and a database layer.

4. The method of claim 1 further comprising:
   determining the plurality security factor values using an as is analysis of the computing system.

5. The method of claim 1 further comprising:
   generating a dashboard display for the computing system based on the computing system security determination.

6. The method of claim 1 further comprising:
   generating a benchmarking outline for at least one of: computing system development and computing system improvement based on the system vulnerability report.

7. The method of claim 1 wherein the operational aspects include: availability, authorization, access control, auditability, integrity and confidentiality.

8. The method of claim 1 wherein the security expectation scale ranges in representation values ranging from inefficient to supreme efficiency.

9. An apparatus for determining a security level of a computing system, the apparatus comprising:
   a memory device having executable instructions stored therein; and
   a processing device coupled to receive the executable instructions from the memory such that the processing device, in response to the executable instructions, is operative to:
      determine a plurality of security factor values for each of a plurality of processing components associated with the computing system by examining operational aspects of the processing components;
      map each of the plurality of security factor values on a security expectation scale; and
      generate a system vulnerability report based on the security factor value mapping from the security expectation scale.

10. The apparatus of claim 9 wherein the computing system operates in at least one of: an enterprise resource planning operating system and a customer relationship management system.

11. The apparatus of claim 10 wherein the processing components include at least one of: a network layer, an interface layer and a database layer.

12. The apparatus of claim 9 wherein the processing device, in response to the executable instructions, is further operative to:
   determine the plurality security factor values using an as is analysis of the computing system.

13. The apparatus of claim 9 further comprising:
   a dashboard display device coupled to the processing device, the processing device further operative to generate a dashboard display for the display device, wherein the dashboard display is based on the system vulnerability report.

14. The apparatus of claim 9 wherein the processing device, in response to the executable instructions, is further operative to:
   generate a benchmarking outline for at least one of: computing system development and computing system improvement based on the system vulnerability report.

15. The apparatus of claim 9 wherein the operational aspects include:
   availability, authorization, access control, auditability, integrity and confidentiality.

16. A computing system security determination device comprising:
   the computing system including a plurality of computing layers and executing at least one of: an enterprise resource planning application and a customer relationship management system thereon;
   a memory device having executable instructions stored therein; and
   a processing device coupled to receive the executable instructions from the memory such that the processing device, in response to the executable instructions, is operative to:
      determine a plurality of security factor values using an as is analysis for each of a plurality of processing components associated with the computing system by examining operational aspects of the processing components;
      map each of the plurality of security factor values on a security expectation scale; and
      generate a system vulnerability report based on the security factor value mapping from the security expectation scale.

17. The device of claim 16 wherein the processing components include at least one of: a network layer, an interface layer and a database layer.

18. The device of claim 16 further comprising:
   a dashboard display device coupled to the processing device, the processing device further operative to generate a dashboard display for the display device, wherein the dashboard display is based on the system vulnerability report.

19. The device of claim 16 wherein the processing device, in response to the executable instructions, is further operative to:
   generate a benchmarking outline for at least one of: computing system development and computing system improvement based on the system vulnerability report.

20. The device of claim 16 wherein the operational aspects include: availability, authorization, access control, auditability, integrity and confidentiality.

21. The method of claim 1, wherein the processing components are of different types and perform different functions within the computing system.

* * * * *